United States Patent
Kato

(10) Patent No.: US 7,216,185 B2
(45) Date of Patent: May 8, 2007

(54) BUFFERING APPARATUS AND BUFFERING METHOD

(75) Inventor: Tetsuya Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 975 days.

(21) Appl. No.: 10/173,103

(22) Filed: Jun. 18, 2002

(65) Prior Publication Data

US 2002/0191218 A1    Dec. 19, 2002

(30) Foreign Application Priority Data

Jun. 19, 2001    (JP)    ............................ 2001-184183

(51) Int. Cl.
| | |
|---|---|
| G06F 15/00 | (2006.01) |
| G06F 15/16 | (2006.01) |
| G06F 3/00 | (2006.01) |
| G06F 5/00 | (2006.01) |
| G06F 13/38 | (2006.01) |
| G06F 13/40 | (2006.01) |
| G06F 13/36 | (2006.01) |

(52) U.S. Cl. .................. 710/52; 358/1.16; 358/1.17; 709/230; 710/1; 710/4; 710/55; 710/66; 710/307; 710/310

(58) Field of Classification Search ............ None
See application file for complete search history.

(56) References Cited

U.S. PATENT DOCUMENTS 5,487,137 A * 1/1996 Matsuhira .................. 358/1.16

FOREIGN PATENT DOCUMENTS

| JP | 5-265940 | 10/1993 |
|---|---|---|
| JP | 2642652 B2 | 5/1997 |

* cited by examiner

*Primary Examiner*—Fritz Fleming
*Assistant Examiner*—Richard Franklin
(74) *Attorney, Agent, or Firm*—Foley & Lardner LLP

(57) ABSTRACT

Buffer control means and output control means are included within a buffering apparatus. Data longer than the width of data bus is read by single access from buffer means. Rather than signal line control for each bus width, signal line control for each data group is performed by a method wherein address administration means holds address information in relationship with each group of a series of data written in the buffer means and data is output from the buffer means.

12 Claims, 13 Drawing Sheets

BUFFERING APPARATUS AND BUFFERING METHOD

FIELD OF THE INVENTION

The invention relates to a buffering apparatus and a buffering method, and particularly to a buffering apparatus and a buffering method which buffers input data in a communication system wherein input data with a plurality of data lengths arrive and, for each data length, the data possesses transfer destination address information and, in addition, for output data, a plurality of data bus widths can be present together.

BACKGROUND OF THE INVENTION

Conventional communication means in general communication equipment for wire communication, radio communication and the like in many cases adopts a construction shown in FIG. 1. As shown in FIG. 1, in communication means 1, input data introduced as conventional communication data through an input end is passed through input interface means 2 and is supplied to buffering means 4 while controlling by communication control means 3 to perform buffering. Further, the input data is subjected to protocol conversion processing in protocol conversion means 5, is then withdrawn from the buffering means 4, is passed through output interface means 6, and is output through an output end.

Here input of data into the communication means (apparatus) 1, that is, the arrival of data, sometimes occurs in such a state that the preparation of the communication means 1 for receiving the input is incomplete. Therefore, the data should be temporarily maintained (buffered) until the preparation for receiving data is complete. Accordingly, the buffering means 4 temporarily maintains (buffers) input data, until the communication means 1 is ready for the receipt of the data, and performs speed buffering. Regarding the buffering means 4, there are many types which, according to the construction of the system, range from one, which requires large buffering, to one which simply permits passage of signals without protocol conversion or the like.

FIG. 2 is a diagram showing the construction of an example of a conventional buffering apparatus. In this drawing, a buffering apparatus 10 is an apparatus for realizing the buffering means 4 shown in FIG. 1 and comprises buffer means 11 comprising n first-in-first-out buffers (FIFOS) or the like and buffer control means 12. The buffer control means 12 comprises buffer write control means 13 for controlling the writing operation of the buffer means 11, buffer read control means 14 for controlling the read operation of the buffer means 11, and buffer access control means 15 for controlling the buffer write control means 13 and the buffer read control means 14.

Further, input control means 16, output control means 17, address administration means 1l, and address control means 19 are provided outside the buffering apparatus 10. As shown in FIG. 3, the input control means 16 comprises input address detection means 161, input address notification means 162, input signal control means 163, and buffer write request control means 164. As shown in FIG. 4, the output control means 17 comprises buffer read request control means 171, output address control means 172, output signal control means 173, and bus width selection means 174.

As shown in FIG. 5, the address administration means 18 comprises address input means 181 and address notification means 182. The address control means 19 comprises address designation interface means 191. On the assumption that DMA or the like is used, the address control means 19 exists in such a case that the address information is separately administered by a processor such as an external central processing unit (CPU). Upon the receipt of addressing from an external part, the address designation interface means 191 directly or indirectly accesses the address administration means 18. As shown in FIG. 6, the buffer means 11 uses a write pointer (BUFWP) and a read pointer (BUFRP) for the buffer (BUF) to simply render the operation for storing data into the buffer continuous and thus to store a group of a series of data.

Next, the operation of the conventional buffering apparatus 10 will be briefly explained. As soon as a certain group of a series of data such as a frame and a packet externally arrives at the input control means 16, the input control means 16 transfers the group of input data to the buffer control means 12. The buffer control means 12 is mainly responsible for the control of writing into the buffer means 11 and reading of data from the buffer means 11 and sequentially writes and stores the group of input data into the buffer means 11.

When the preparation on the output side has been completed, processing for outputting is started by the buffer control means 12. The series of data group is read from the buffer means 11, is passed through the output control means 17. and is output. In outputting the series of data, the output control means 17 selects output bus width, and the data are divided into or integrated into necessary data width followed by outputting.

Here when the bus on the side of input into the buffering apparatus 10 is an address data bus which contains an address by time division, the input control means 16 separates address information from the bus and notifies the address administration means is of the address. The address administration means is maintains the address and sends the address information to the buffer access control means 15 in synchronization with the time of output of the series of data group. In the prior art technique, since the construction of juxtaposed buffers is simple, the address administration means 18 has the function of maintaining the input address as it is until the address is output.

Further, the conventional construction is generally such that, upon the receipt of a request from the external part for output from the buffer, data is fetched from the buffer according to the request. The requirement for the start of reading of the data is that necessary data length has been stored in the buffer. Here whether or not the necessary data length has been stored in the buffer is examined for the juxtaposed buffers.

Another example of the conventional buffering apparatus is disclosed in Japanese Patent No. 2642652(Japanese Patent Laid-Open No. 198143/1989. This conventional buffering apparatus comprises: a double buffer comprising first and second buffers which absorb a fluctuation in input packet data, which arrive at irregular timing, and send output data at fixed timing, the first and second buffers being alternately switchable on the input side and the output side; a buffer control unit for monitoring data capacity within the double buffer and controlling the switching of the double buffer using one packet data output period as the shortest switching unit period; FIFO provided on the input side of the double buffer, for buffering the input packet data; and an FIFO control unit for controlling the transfer of data from the FIFO to the double buffer according to the switching of the buffer by the buffer control unit. According to this construction, a fluctuation in packet data, which arrives at irregular timing, is absorbed to prevent one packet data from being divided into a plurality of parts which are stored in a plurality of buffers.

The conventional buffering apparatuses have the following problems. At the outset, in many cases, the buffering apparatus is mounted completely separately from the bus width selection means, and, thus, due to the form of mounting, the optimization of processing is difficult. Specifically, within the communication means 1 shown in FIG. 1, under control by the communication control means 3 and the protocol conversion means 4, a decision is made on branching for processing, and the bus width selection means for selecting the bus width necessary for the processing is provided for speed buffering for absorbing the processing time difference and performs bus width conversion for enhancing the capacity of processing at a time per unit time.

This bus width selection means can be realized, for example, in a construction disclosed in Japanese Patent Laid-Open No. 2659401/1993, that is, a construction wherein, in a module comprising an asynchronous buffer memory provided integrally with a group of data width conversion buffers some of multiple input 8 bits are combined, and bus width conversion is performed for 32-bit output (or output of less than 32 bits).

Here, for example, when real-time processing is necessary, assuming that one-byte input data is present for each clock, in the processing within the device (communication means 1), if 2 clocks are used for one byte, processing cannot catch up with input data. In this case, input data overflow, and the processing fails. When the processing method and bus width are converted in such a manner that, within the device (communication means 1), for example, two bytes can be processed per clock, the same speed as the input data can be apparently realized. The bus width selection means is means for this bus width conversion. Since, however, in the prior art technique, the bus width selection means is provided completely separately from the buffering apparatus, it is difficult to optimally covert buffer bus width and output bus width.

The second problem of the conventional apparatus is that, since the buffering apparatus 10 is provided completely separately from the address administration means 18, this construction is inefficient when there are a plurality of bus widths in such a state that a plurality of data groups are simultaneously buffered. As found in conventional means, in many cases, buffer function and address administration function are divided into separate construction blocks, and pure buffer is provided independently of pure data transfer such as DMA. Since, however, signal line is managed for each bus width, signal lines, for which common control is possible, are managed separately from each other or one another. This is inefficient.

The third problem of the conventional apparatus is as follows. The buffer in the buffer means 11 and the double buffer in the buffering apparatus disclosed in Japanese Patent No. 2642652 are fixedly present with respect to the maximum storage data length, and a problem exists in a physical structural buffer construction wherein a series of data groups are selected and retrieved from a plurality of maximum fixed length buffers. For example, when several maximum data length fixed buffers, which are extensively used in the conventional buffering apparatus, are provided, even though the length of a certain data group does not reach the maximum data length, the idle portion cannot be allocated to a different data group.

SUMMARY OF THE INVENTION

Accordingly, it is a first object of the invention to provide a buffering apparatus and a buffering method wherein buffer function and bus width selection function are integrally handled to realize optimized processing.

It is a second object of the invention to provide a buffering apparatus and a buffering method wherein signal lines, such as control lines with respect to a plurality of bus widths, for which common control is possible, are integrally handled to realize signal line management for each output data group rather than signal line management for each bus width.

It is a third object of the invention to provide a buffering apparatus and a buffering method wherein the concept per se of the double buffer in the buffering apparatus disclosed in Japanese Patent No. 2642652 is constructed by FIFO to reduce the number of stages of buffers and, in addition, rather than handling of only two data groups in two juxtaposed buffers, relatively flexible handling of buffer length relative to data length is realized to permit the storage of a plurality of data groups in a certain moment.

According to the first feature of the invention, a buffering apparatus comprises: input control means that permits the input of a plurality of groups of a series of data, which have been combined in time sequence, detects a break of each group of a series of data, and separates address information from on an input bus; buffer means comprising a plurality of buffers; buffer control means for writing, based on the break information, each group of a series of data transferred from the input control means into each buffer in the buffer means and for reading the written group of data; address administration means which holds the address information, sent from the input control means, in relationship with each group of a series of data written in the buffer means, and, at the time of output involving reading the group of a series of data from the buffer means, upon the receipt of a request for address, fetches the held address and sends the fetched address to the buffer control means; and output control means which, in response to a request from an external part for reading, makes a request to the address administration means for address notification and sends the address information received from the address administration means, to the external part and, in addition, controls the buffer control means so as to read the data group from the buffer means, divides or combines the bus width of the read data group and selectively sends the data to an output bus having a required bus width in a plurality of output buses having mutually different bus widths.

According to this construction, the buffer control means and the output control means are included within the buffering apparatus. This can realize integral processing, and data longer than the width of the data bus can be read by single access from the buffer means.

Further, according to this construction, rather than signal line control for each bus width, signal line control for each data group can be realized by a method wherein the address administration means holds address information in relationship with each group of a series of data written in the buffer means and data is output from the buffer means.

In the buffering apparatus according to the first feature of the invention, preferably, at the time of writing of the group of a series of data into the buffer means, the buffer control means updates group attribute value for each writing of the group of a series of data and notifies the buffer means and the address control means of the group attribute value and, in addition, updates a write pointer for each data and performs writing in the buffer means, and the buffer means writes, in the buffer at the storage position of the write pointer, said data, the group attribute value, and a predetermined storage attribute value representing the storage. According to this construction, control for each data group stored in the buffer means can be realized. Further, the status of the data storage in the buffer means can be managed.

In the buffering apparatus according to the first feature of the invention, preferably, at the time of reading of the group of a series of data from the buffer means, the buffer control means reads the data from the buffer within the buffer means at a predetermined buffer pointer position according to the output bus width and, upon the completion of reading, the buffer control means changes the storage attribute of the buffer to a predetermined value representing idle. According to this construction, the status of storage of the data group in the buffer means can be grasped.

In the buffering apparatus according to the first feature of the invention, preferably, the buffering means stores the groups of a series of data in a plurality of buffer data regions and additionally stores, in one-to-one relationship with the data regions, a group attribute, which is different from data group to data group and is identical in the same data group and a storage attribute representing a stored state or a unstored state, and the output control means comprises at least: buffer read request control means which, in response to a request from an external part for reading, reads the data group from the buffer means through the buffer control means; output address control means which makes a request to the address administration means for address notification, receives address information from the address administration means, and sends the address information to the external part; buffer attribute monitoring means for monitoring, based on the group attribute and the storage attribute, whether or not data of the same group attribute having a data length corresponding to the bus width is stored in the buffer means; buffer attribute control means for controlling the attribute value at the time of reading of the data from the buffer means; and bus width selection means for selectively sending, to an output bus with a bus width to be output, the data of the same group attribute having a data length corresponding to the bus width read from the buffer means through the buffer control means.

According to this construction, since the data group, together with the group attribute and storage attribute for the data group, is stored in the buffer means, instead of handling of only two data groups in two juxtaposed buffers, relatively flexible handling of buffer length relative to data length of the data group can be realized, and a plurality of data groups can be stored in parallel in the buffer means, In the buffering apparatus according to the first feature of the invention, preferably, when the length of data of the same group attribute stored in the buffer means is shorter than the width of the output bus, the bus width selection means inserts a dummy data for supplementing the deficit data into the data read from the buffer means and outputs the data.

In the buffering apparatus according to the first feature of the invention, preferably, the address administration means comprises: address input means for incorporating address information from the input control means; address storage means for storing, in a table form, the address, incorporated by the address input means, together with a group attribute of the data group and a storage attribute for representing a stored or unstored state, in one-to-one relationship with the data group written in the buffer means; address selection means which, upon the receipt of a request from the output control means for address output, fetches the address stored in the address storage means; and address notification means for sending the address selected by the address selection means to the output control means.

In the buffering apparatus according to the first feature of the invention, preferably, the address storage means executes reading of the address from the address table by a read pointer and resets the storage attribute corresponding to the read address. According to this construction, the address administration means can be always associated with the contents of the buffer means.

In the buffering apparatus according to the first feature of the invention, preferably, address control means is further provided for, upon the receipt of addressing from an external part, directly or indirectly accessing the address administration means. According to this construction, the storage value of the output address can be externally controlled. Therefore, this construction can be applied to the case where address information is separately controlled by an external processor on the assumption that DMA or the like is used.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
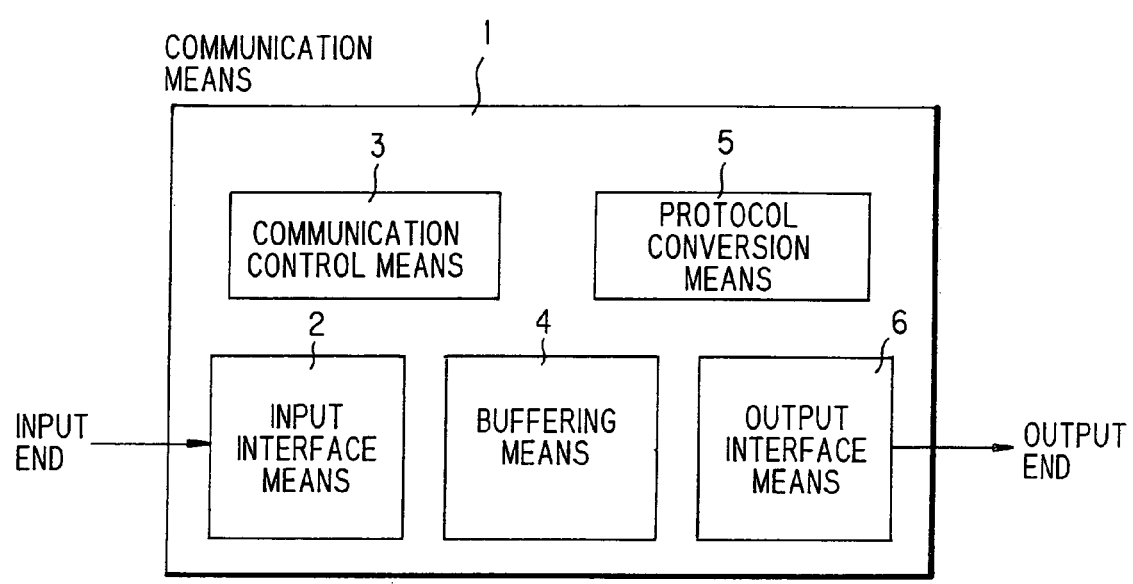
FIG. 1 is a diagram showing the construction of general conventional communication means.
Figure 2:
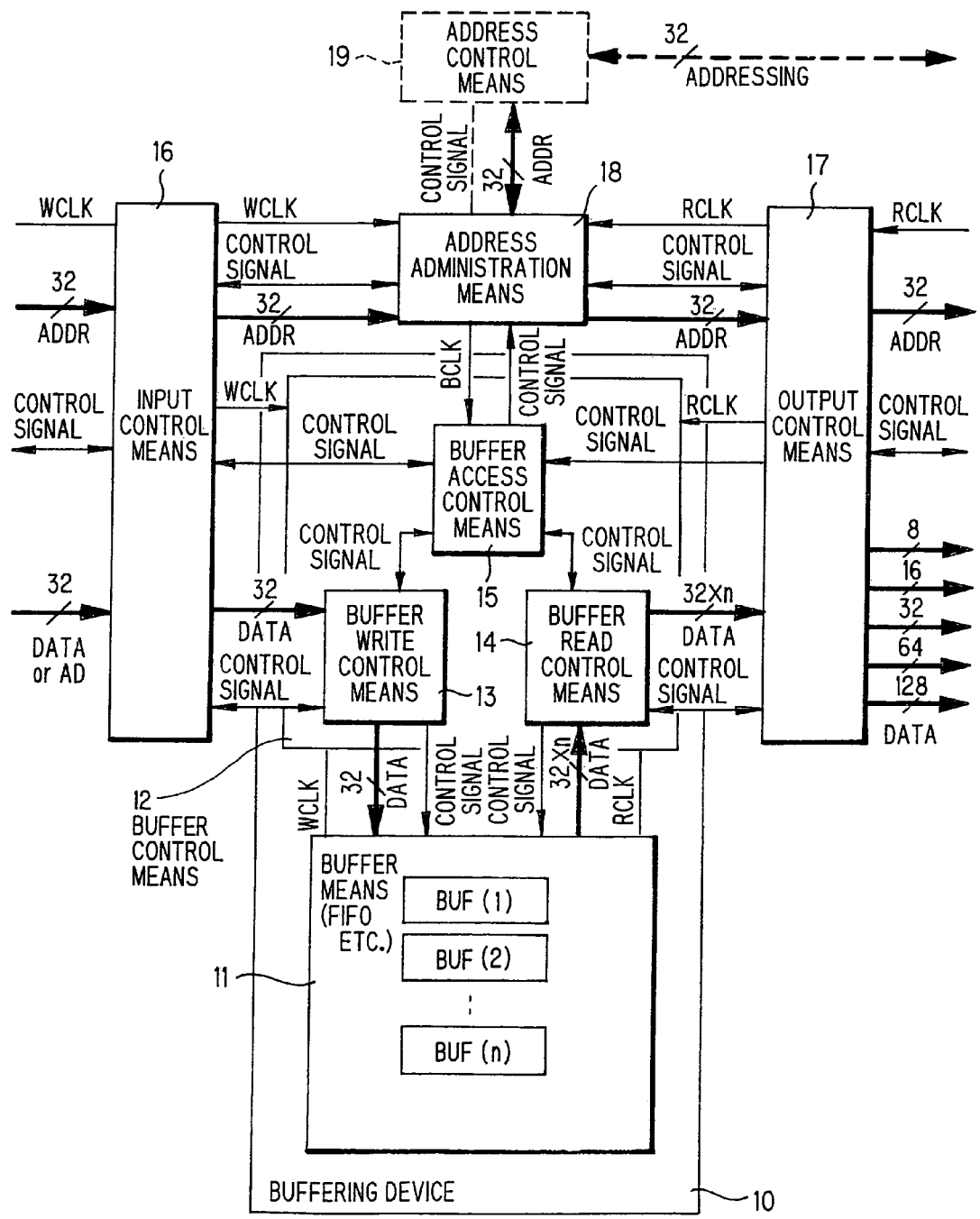
FIG. 2 is a diagram showing the construction of an example of a conventional buffering apparatus.
Figure 7:
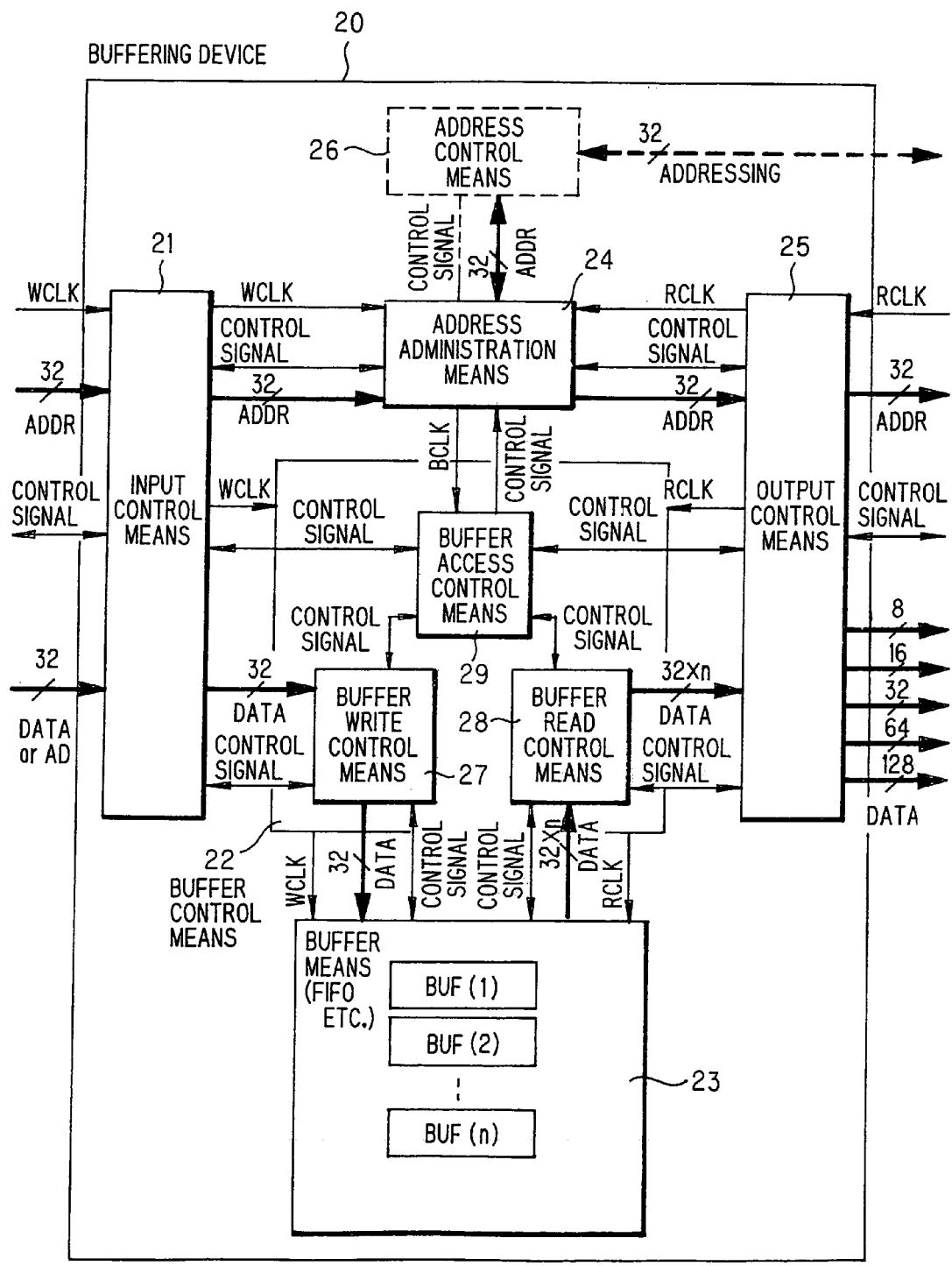
FIG. 7 is a diagram showing the construction of a first preferred embodiment of the buffering apparatus according to the invention.

Preferred embodiments of the invention will be explained in conjunction with the accompanying drawings. FIG. 7 is a diagram showing the construction of a preferred embodiment of the buffering apparatus according to the invention, In FIG. 7, a buffering apparatus 20 is an apparatus for realizing the buffer means 4 shown in FIG. 1 and comprises input control means 21, buffer control means 22, buffer means 23, address administration means 24, and output control means 25. If necessary, address control means 26 is additionally provided. The buffer means 23 comprises n FIFOs wherein n is an integer of 2 or more. The buffer control means 22 comprises: buffer write control means 27 for controlling the writing operation of the buffer means 23; buffer read control means 28 for controlling the reading operation of the buffer means 23; and buffer access control means 29 for controlling the buffer write control means 27 and the buffer read control means 28.

In this preferred embodiment, the input control means 21, the address administration means 24, the output control means 25, and the address control means 26, together with the buffer control means 22 and the buffer means 23, are provided within the buffering apparatus 20. In this buffering apparatus 20, upon input of a series of data groups, the input control means 21 transfers the input data to the buffer control means 22, whereby input data groups are sequentially written and stored in the buffer means 23 constituted by FIFO or the like.

As soon as the preparation on the output side has been completed, the buffer control means 22 starts processing for output, reads the data group from the buffer means 23, and outputs the data group through the output control means 25. In outputting the series of data, the output control means 25 selects output bus width and outputs the data after division or integration of data into a necessary data width.

Here when the input-side bus for the buffering apparatus 20 is an address data bus containing address as a result of time division, the input control means 21 separates the address information from the bus and notifies the address administration means 24 of the address. The address administration means 24 holds the address and outputs the address information in synchronization with the output of the series of data groups.

Figure 3:
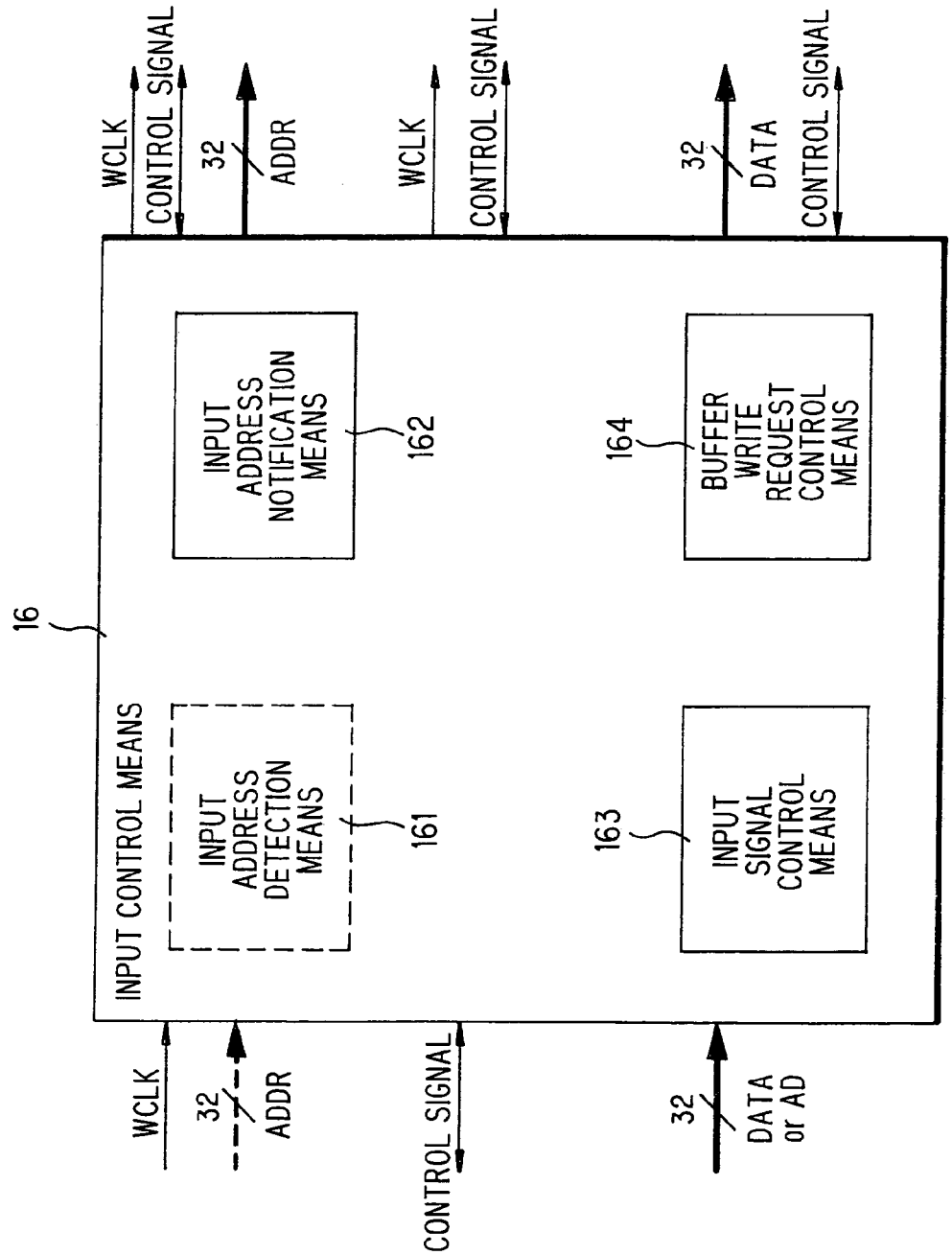
FIG. 3 is a diagram showing the construction of an example of conventional input control means.
Figure 8:
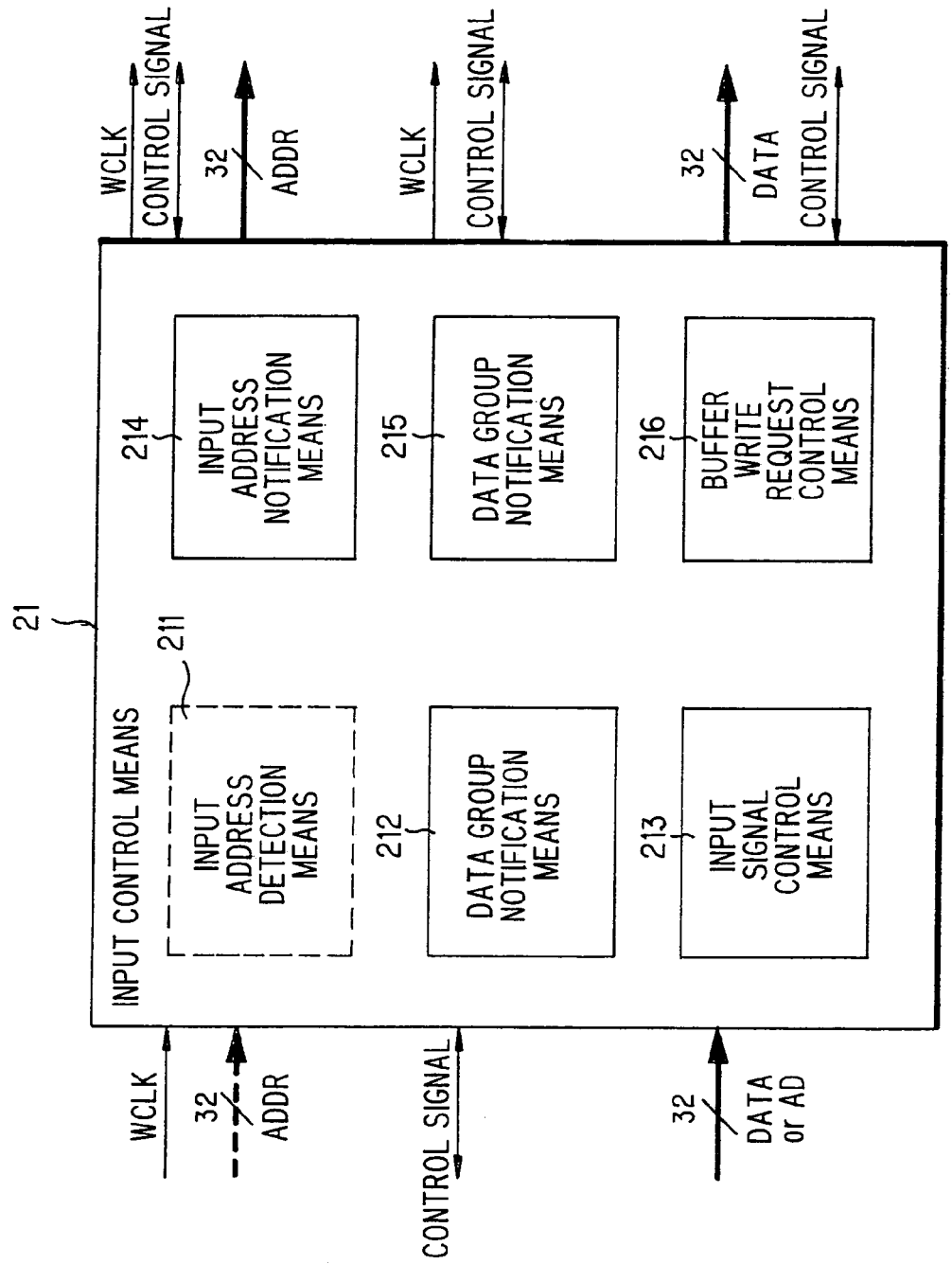
FIG. 8 is a diagram showing a preferred embodiment of the construction of the input control means shown in FIG. 7.

As shown in FIG. 8 (block diagram), the input control means 21 comprises input address detection means 211, data group detection means 212, input signal control means 213, input address notification means 214, data group notification means 215, and buffer write request control means 216. The input control means 21 is different from the conventional input control means 16 shown in FIG. 3 in that the data group detection means 212 and the data group notification means 215 are additionally provided.

Specifically, in the conventional input control means 16, the detection of the data group is merely done by a signal for start or end of buffering. On the other hand, in the input control means 21 in this preferred embodiment, the data group detection means 212 for handling a plurality of data groups is intentionally provided, and a detection signal for learning a data group break is introduced from within the input control means 21 or externally introduced. This data group break is used, for example, for group attribute toggle flag in the buffering apparatus, address storage opportunity of the address administration means 24, and grasp of completion of buffer storage in the output control means 25.

The data group break is determined by input unit. Here, for example, when a 32-bit multiplexer bus meeting PC card/card bus specifications is connected to the input side, units of 4 bytes ×n times "frame" are applied to the data group. Surplus bytes of less than 4 bytes (for example, 3 bytes as the remainder of 63-byte transfer length) are also controlled by byte enabling, Therefore, regarding the transfer length, one byte-by-one byte transfer is substantially possible. Accordingly, for the data group, assumed input units such as units of 4 bytes ×n times (or m bytes) are used, and the data group break is provided for each received frame or each received packet.

Further, in the conventional buffering apparatus, since the construction of juxtaposed buffers is simple, the function of holding the input address as it is by the input control means 16 until the data is output suffices for the conventional buffering apparatus. On the other hand, in this preferred embodiment, since a plurality of data groups are handled, a plurality of addresses for output destinations are designated, and, thus, the administration of these addresses is important. For this reason, the input address notification means 214 within the input control means 21 notifies the address administration means 24, which will be described later, provided within the buffering apparatus 20, of the plurality of output destination addresses to realize integral processing.

Figure 9:
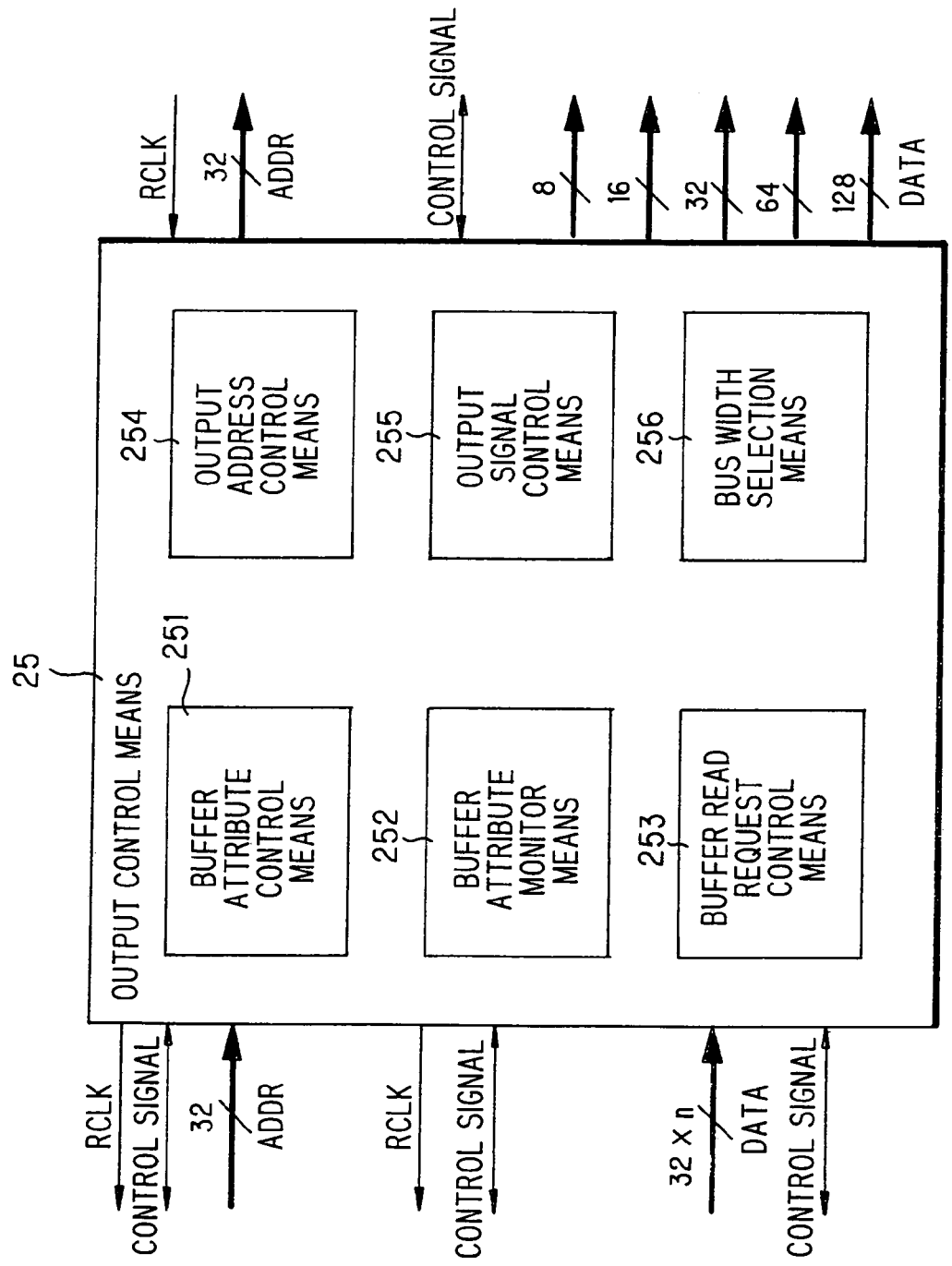
FIG. 9 is a diagram showing a preferred embodiment of the construction of the output control means shown in FIG. 7.

As shown in FIG. 9, the output control means 25 provided within the buffering apparatus 20 comprises buffer attribute control means 251, buffer attribute monitoring means 252, buffer read request control means 253, output address control means 254, output signal control means 255, and bus width selection means 256. In response to the request from the external part for reading, the buffer read request control means 253 reads data group from the buffer.

Figure 4:
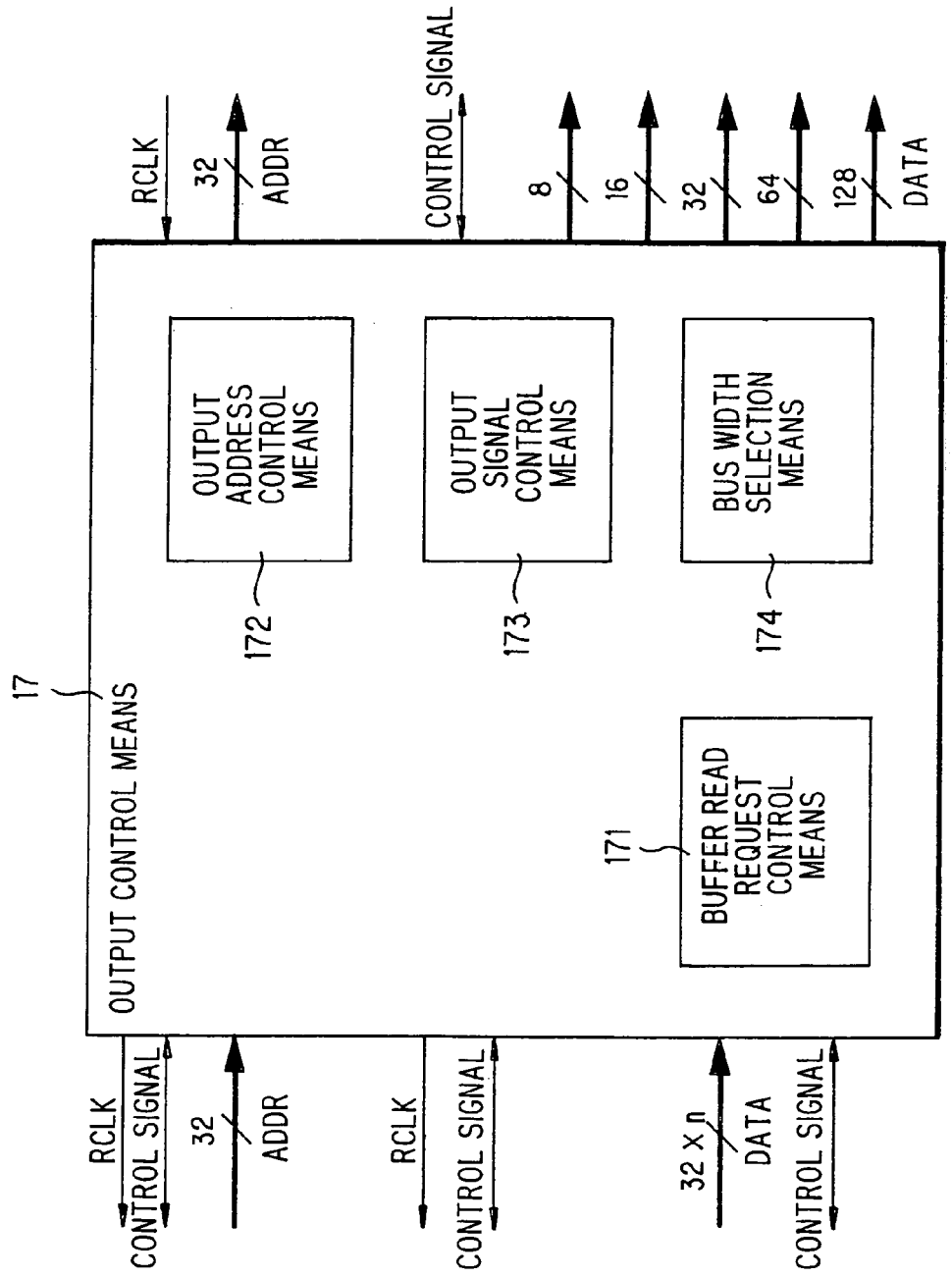
FIG. 4 is a diagram showing an example of the conventional output control means.

This output control means 25 is different from the conventional output control means 17 shown in FIG. 4 in that the buffer attribute control means 251 and the buffer attribute monitoring means 252 are additionally provided. Specifically, in the conventional output control means 17, in many cases, upon the receipt of the request from the external part for output of data from the buffer, data is retrieved from the buffer. The condition for the start of reading of data is that necessary data length has been stored in the buffer. Here, whether or not the necessary data length has been stored is examined for the juxtaposed buffers.

On the other hand, in the output control means 25 in this preferred embodiment, the buffer attribute monitoring means 252 always monitors the storage status of the buffer per se based on a control signal which is sent from the buffer means 23 through the buffer read control means 28 to the output control means 25 and continues judgment on whether or not the buffer attribute flag, which will be described later, for learning, whether or not the necessary data length has been stored, conforms to the output condition. The buffer attribute flag used herein is controlled by the buffer attribute control means 251, for example, at the time of storage into the buffer and at the time of release of the buffer.

Further, in the conventional control means 17, in many cases, the output bus selector is constructed separately from the buffering apparatus. This necessitates the provision of necessary control signals. In particular, in the case of a different output bus width, the storage length should reach data length corresponding to the bus width. Information on whether or not the condition is met is provided by the buffering apparatus.

On the other hand, in this preferred embodiment, the provision of the bus width selection means 256 within the output control means 25 enable the output to be started as soon as the output condition is met. This can eliminate the need to individually control the bus width selection for the output side. This method is advantageous in that, for example, in the case of output from a 32 bit-width buffer to 64 bit width, in the conventional output control means 17, 32 bit-width data should be output twice followed by reconstruction to give 64 bit width, whereas, in this preferred embodiment, at the time of reading from the buffer means 23, reading of 64 bit width is already possible. This is true of a bit width expansion circuit of 128-bit width or the like.

In the case of output from a 32 bit-width buffer to 16 bit width, in the conventional output control means 17, after 32 bit-width data is once output, reconstruction to access of twice in 16 bit width is necessary, whereas, in this preferred embodiment, at the time of reading from the buffer means 23, when the buffer attribute is controlled using the buffer attribute control means 251, after the completion of reading of 16 bit width twice, the buffer can be released. This is true of a bit width reduction circuit of 8 bit width or the like.

In the preferred embodiment shown in FIG. 7, the width of the data bus from the buffer means 23 to the output control means 25 is 32 bits ×n wherein n is a value for satisfying the sending to the output bus width and is selected. When the output bus width is 16 bits, data of 32 bits is first read and, thereafter, is divided into two 16-bit parts which are then output. On the other hand, when the output bus width is 64 bits or a value obtained by multiplying 64 bits by an integer, a plurality of 32-bit outputs in the buffer means 23 are bundled, and data of 64 bits or a value obtained by multiplying 64 bits by an integer is output at a time Further, in the conventional output control means 17, the control is simple, and, in the selection of the output address, the address information held at the time of input as such is used. On the other hand, in the output control means 25 in this preferred embodiment, the output addresses are individually managed for respective data groups. Therefore, necessary information is retrieved from the address administration means 24, which will be described later, and, together with the data group, is output.

Figure 10:
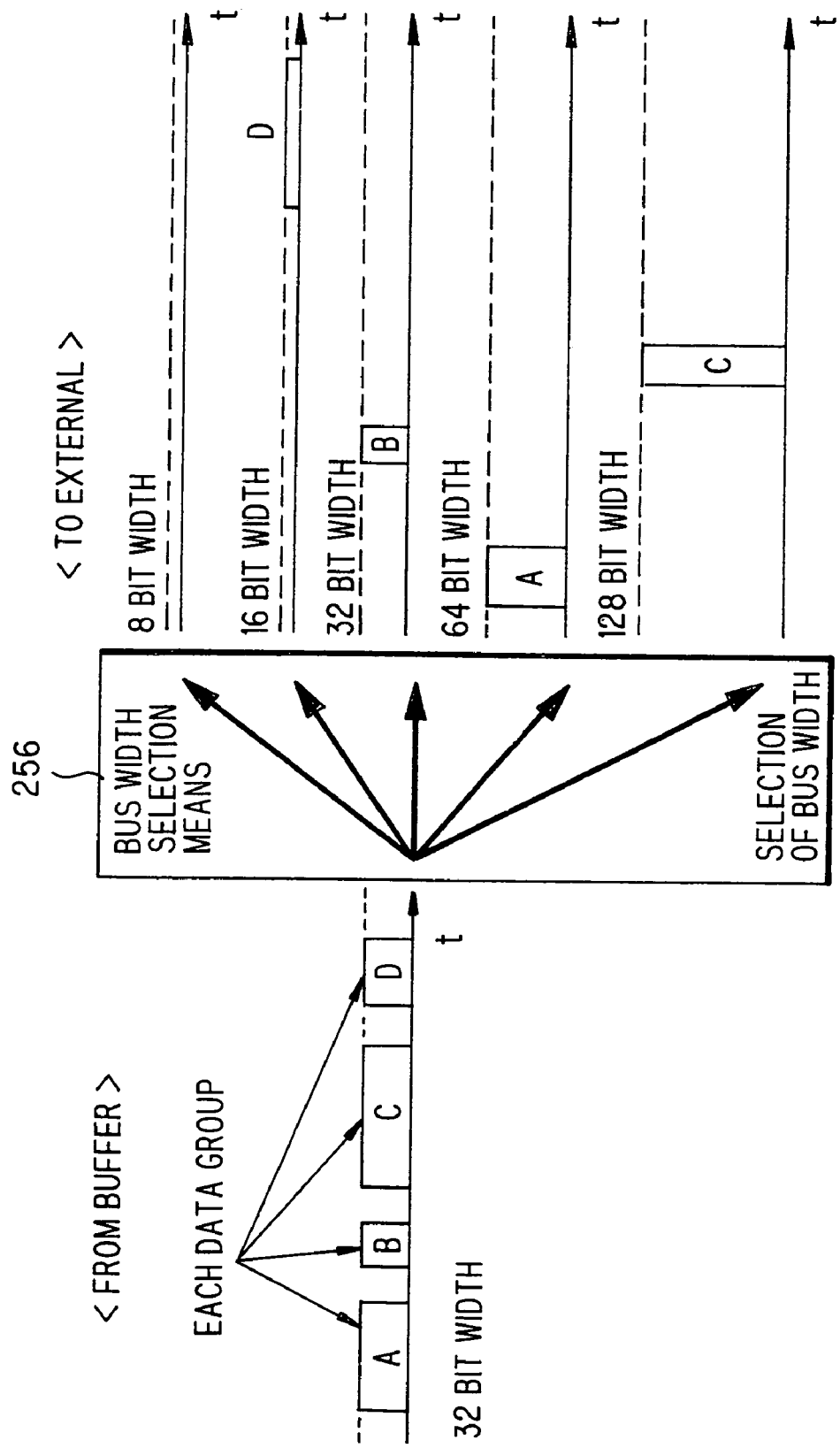
FIG. 10 is a diagram illustrating the operation of bus width selection means as a principal part of the invention.

Further, as shown in FIG. 10, when continuous transfer is possible in both input and output, in the selection of the bus width in the bus width selection means 256 within the output control means 25, the time width simply varies depending upon the output bus width. Thus, the number of accesses and, at the same time, access time can be reduced by reading, by the bus width selection means 256, while considering the bus width on the output side, at the time of input from the direction of the buffer.

Figure 11:
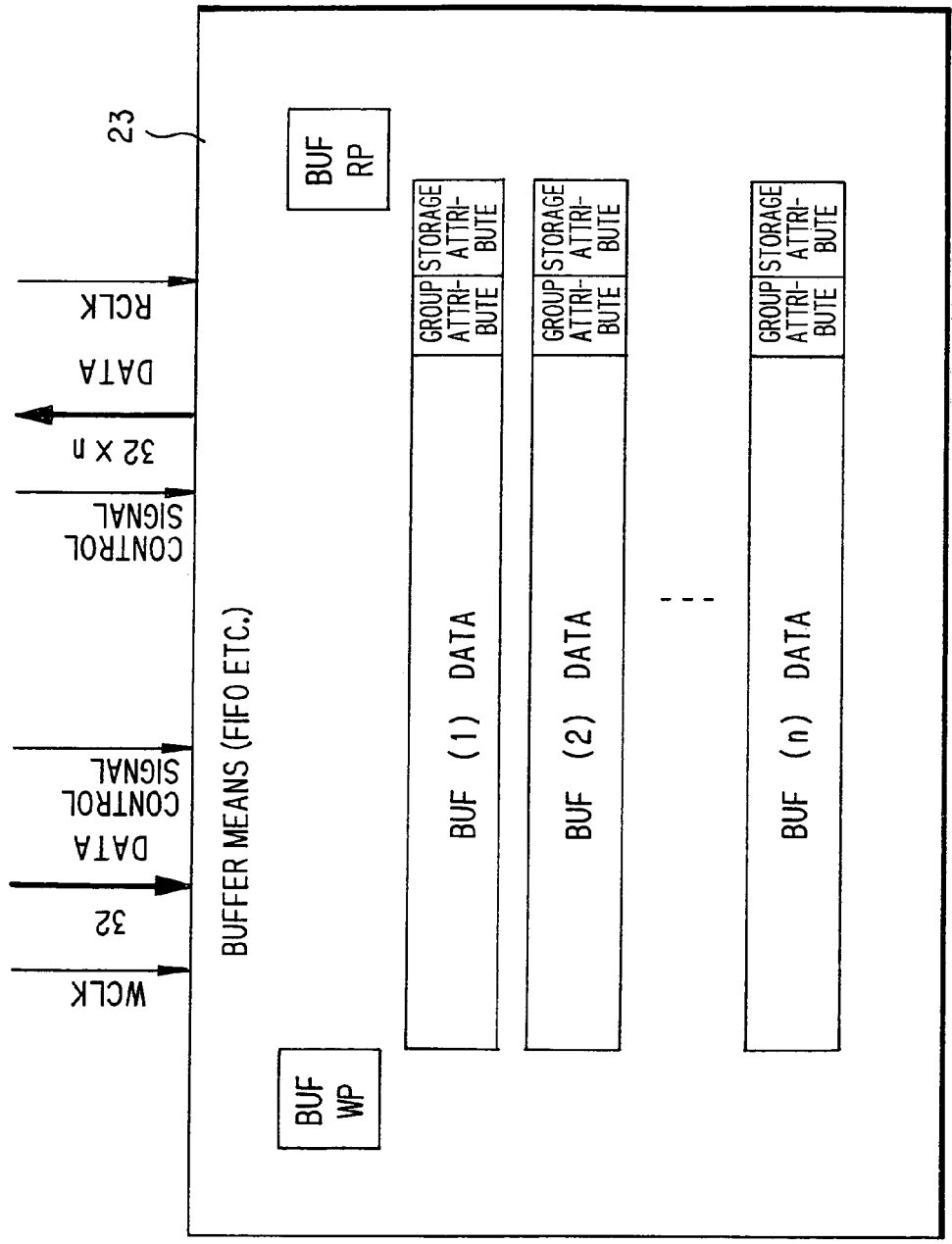
FIG. 11 is a diagram showing a preferred embodiment of the construction of the buffer means shown in FIG. 7.

Next, the construction of the buffer means 23 within the buffering apparatus 20 will be explained. As shown in FIG. 11 (construction diagram), the buffer means 23 comprises n FIFO buffers, and two buffer attributes of group attribute region and storage attribute region are added in one-to-one relationship with each of data regions of buffer contents (BUF (1) to BUF (n)). The information is always monitored by the buffer attribute monitoring means 252 within the output control means 25.

"Storage attribute" shown in FIG. 11 is a buffer attribute flag wherein, regarding whether or not the storage has been made, two values or multivalues, that is, unstored state represeted by 0(zero) and stored state represented by a value of 1 or more, are allocated. This storage attribute is set at the time of writing by the buffer write control means 27 shown in FIG. 7 and is reset upon the completion of reading from one buffer by the buffer reading control means 28 shown in FIG. 7. In this case, there is a possibility that the number of times of reading is two or more depending upon the output bit width.

The "group attribute" shown in FIG. 11 is a buffer attribute flag which imparts an identical attribute to a group of a series of data and wherein a two-value (0 and 1) toggle or a multivalue is allocated to each data group. The update of the value is performed every time when data is stored in the buffer. The group attribute value is also in synchronization with the address storage means, which will be explained later, within the address administration means 24. In FIG. 11, BUPWP designates a write pointer for the buffer, and BUFRP a read pointer.

Figure 5:
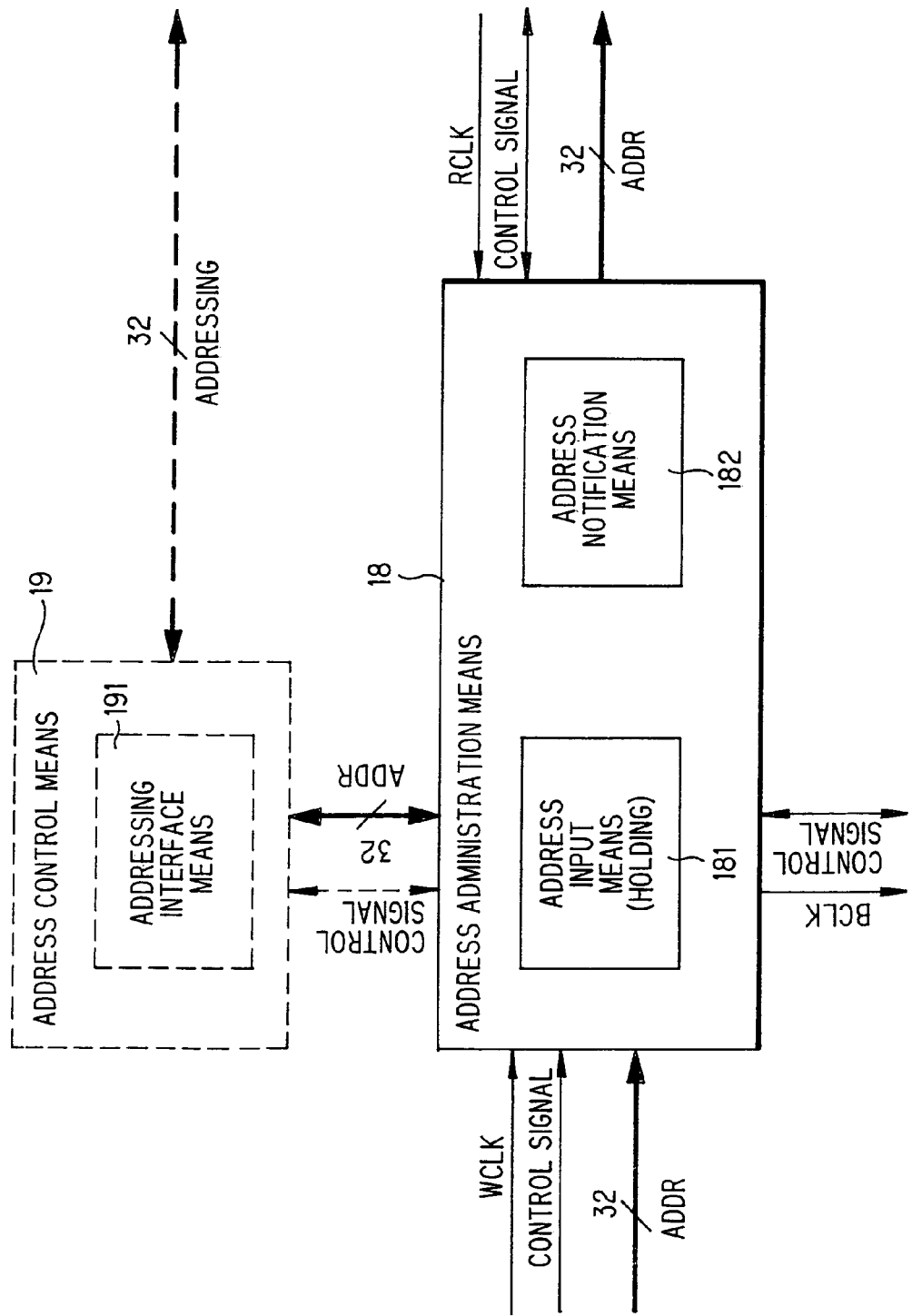
FIG. 5 is a diagram showing an example of conventional address administration means and address control means.
Figure 6:
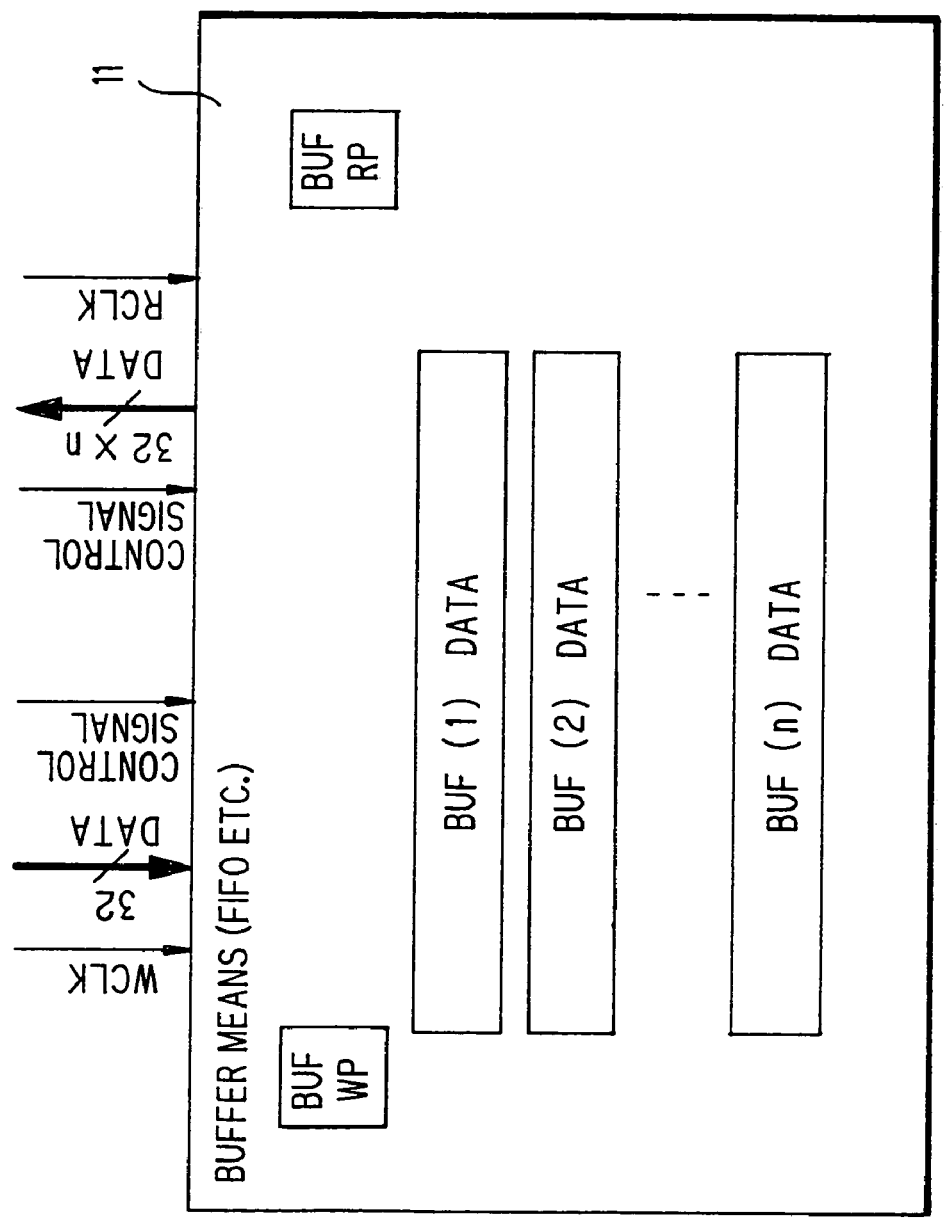
FIG. 6 is a diagram showing an example of conventional buffer means.
Figure 12:
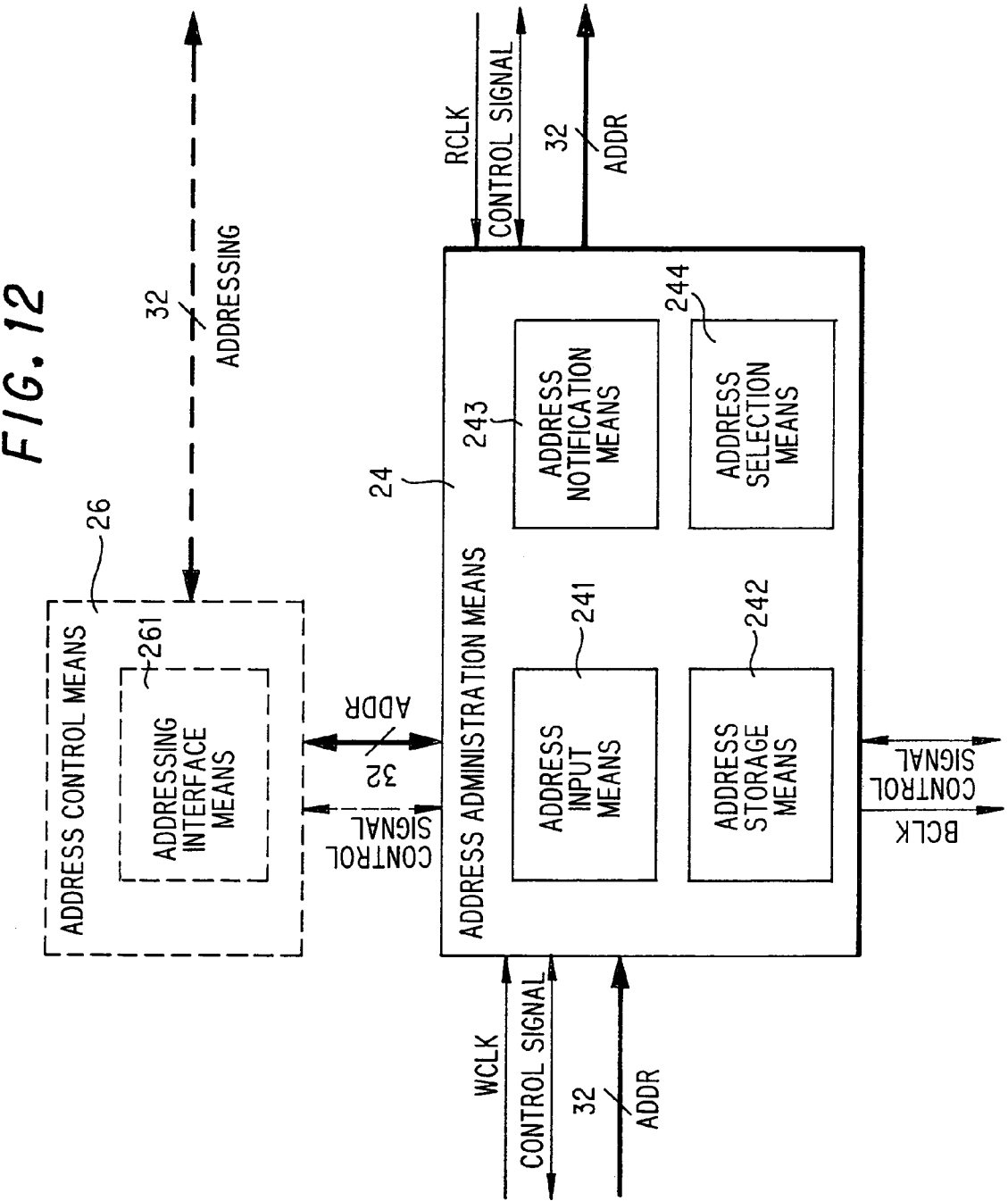
FIG. 12 is a diagram showing a preferred embodiment of the construction of the address administration means and address control means shown in FIG. 7.

The address administration means 24 within the buffering apparatus 20 will be explained. As shown in FIG. 12 (block diagram), the address administration means 24 comprises address input means 241, address storage means 242, address notification means 243, and address selection means 244. This address administration means 24 is different from the address administration means 18 provided outside the conventional buffering apparatus 10 shown in FIG. 5 in that the address storage means 242 and the address selection means 244 are additionally provided.

In the prior art, as typified by the buffering apparatus disclosed in Japanese Patent No. 2642652(Japanese Patent Laid-Open No. 198143/1989), in many cases, the construction of the buffer is simple, and address output can be realized by merely holding the address in number corresponding to the number of buffers provided as address input means. As in this preferred embodiment wherein the buffer is provided for a plurality of data groups, however, this construction is somewhat unsatisfactory.

Accordingly, as shown in FIG. 12, in the address administration means 24 in this preferred embodiment, the address input means 241 has an interface for the address storage means 242, and the address selection means 244 copes with the request from the external part for address output. The result of selection by the address selection means 244 is notified by the address notification means 243 to the output control means 25 shown in FIG. 7.

As found in DMA transfer, for an address, to be accessed, input into the address input means 241 shown in FIG. 12, when the address is sent in such a state that the address has been replaced by another address, as shown in FIGS. 7 and 12, the address control means 26 is installed within the buffering apparatus 20 so that addressing from the external part is possible.

Figure 13:
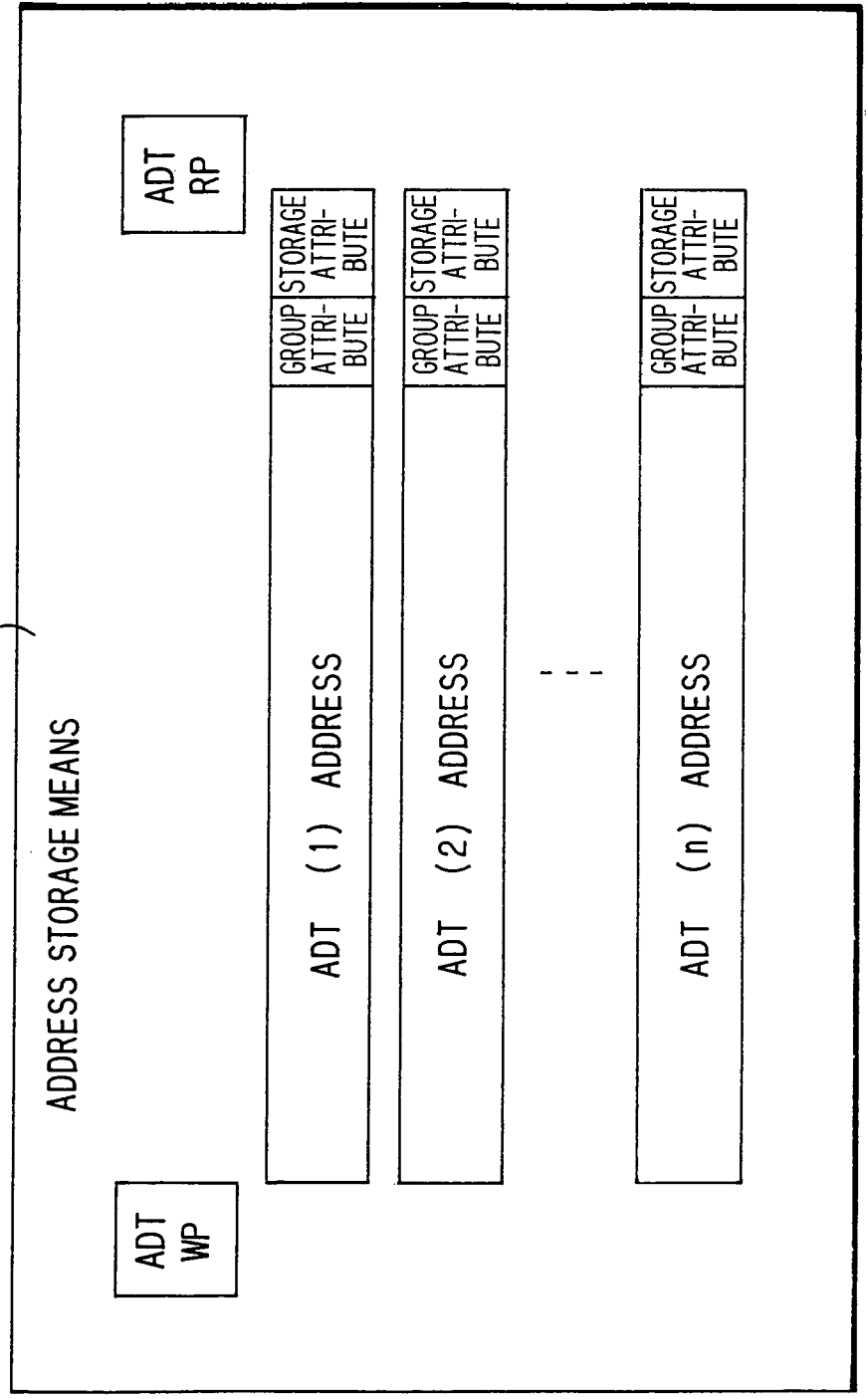
FIG. 13 is a diagram illustrating a preferred embodiment of the construction of the address storage means shown in FIG. 6.

In this preferred embodiment, since a plurality of addresses should be administered, as shown in FIG. 13, the address storage means 242 adopts a construction similar to the construction of the buffer means 23 shown in FIG. 11. In this case, in consideration of the fact that the address information is in one-to-one relationship with the series of data groups and the address processing is sequential processing, FIFO-type buffering is performed by a write pointer (ADTWP) and a read pointer (ADTRP) for the address table (ADT).

In addition to output address ADT (m) corresponding to the series of data groups, an address table attribute comprising group attribute and storage attribute is stored in the address table. The "storage attribute" in this address storage means 242 is an address table attribute flag wherein, regarding whether or not the storage has been made, two values or multivalues, that is, unstored state represeted by 0 (zero) and stored state represented by 1, are allocated. This storage attribute is set when the address information has been updated by the input control means 21 or the address control means 26, while the storage is reset at the time of the completion of output of address by the output control means 25.

The "group attribute" in the address storage means 242 shown in FIG. 13 is a group attribute per se, which has been imparted by the buffer means 23, and is an address table attribute flag wherein a two-value (0 and 1) toggle or a multivalue is allocated to each data group.

In the invention, the buffer capacity (n stages) of the buffer means 23 and the address table capacity (m) of the address storage means 242 are not definitely defined and are system parameters determined by an applied communication system. However, when n different data groups are input into the buffers, n addresses should be stored in the address storage means 242. Therefore, in general, no problem occurs when m=n.

Here only when m=n, the storage position on the buffer can be rendered synonymous with the storage position on the address table. In this case, in some cases, a part of the administration of the pointer in the buffer and the address table can be omitted, and processing can be carried out by an identical read pointer or an identical write pointer. On the other hand, when m is not equal to n, a status exists such that the buffer means 23 or the address storage means 242 is in a fully stored state. In this case, control for the requested side to bring the requester to a waiting state.

Next, the operation of the buffering apparatus 20 according to a preferred embodiment of the invention will be explained.

A group of a certain series of data, such as frame and packet, from an external part arrives at the input control means 21 within the buffering apparatus 20 shown in FIG. 7, The data group detection means 212 shown in FIG. 8 within the input control means 21 recognizes that the input series of data are different from previously input data. The start of processing of a new data group is notified by the data group notification means 215 to each section within the buffering apparatus 20. On the other hand, the input address detection means 211 within the input control means 21 extracts the accessed address, and the extracted address is notified by the address notification means 214 to the address administration means 24. In this connection, it should be noted that the provision of the input address detection means 211 is not essential.

In order to start the transfer of the arrived group of a series of data, the input control means 21 sends, from the internal buffer write request control means 216, a request for writing, informing that data to be written exist, to the buffer control means 22, and, as soon as the buffer control means 22 accepts the request for writing, the input control means 21 starts the transfer of the group of data to the buffer control means 22.

Upon the receipt of the request from the buffer write request control means 216 for writing, the buffer control means 22 starts preparations for writing of the group of a series of data into the buffer, specifically, the buffer write control means 27 starts the operation through the buffer access control means 29 within the buffer control means 22, updates the group attribute for each new group of a series of data, and notifies the buffer means 23 and the address administration means 24 of a group attribute value represented by 0, 1, or a value of more than 1. Further, the buffer write control means 27 updates the buffer write pointer, every time when each data in the group of a series of data has arrived, and performs writing of data in the buffer means 23. In this case, when there is no idle buffer in the buffer means 23, a standby state is adopted (or the data is discarded).

At the time of writing, as soon as data to be written has arrived, the buffer means 23 stores data content and group attribute in the storage position indicated by the corresponding write pointer and sets the storage attribute to 1 or a value of more than 1. When all the storage attributes are 1, that is, when there is no idle buffer in the buffer means 23, in particular, in FIFO type, when the storage attribute, in the pointer position at which writing is next to be made, is 1 or a value of more than 1, the buffer means 23 notifies the buffer write control means 27 of that, because of the standby state, the request for writing should not be accepted, when the next pointer position of the write pointer is idle, a next group attribute predetermined value is previously written therein.

Next, a request for taking off the group of a series of data is made from an external part to the output control means 25. The output address control means 254, shown in FIG. 9, within the output control means 25 makes a request to the address administration means 24 for address notification so that, since processing of a group of data different from the previous group of data is started, the output address is retrieved with a next data group attribute. Upon the receipt of address information, the address is sent to the external part. In this case, there are two cases, i.e., a case where only a head address is output and a case where an address increment is carried out for each data according to the bus width.

The bus width selection means 259 within the output control means 25 starts up the selector for selecting a bus having the corresponding bus width. Further, in order for the buffer read request control means 253 to start reading, the buffer attribute monitoring means 252 within the output control means 25 confirms whether or not the data belonging to the same group attribute of data length corresponding to the bus width have been stored in the buffer. As soon as the storage of these data has been confirmed, the buffer read request control means 253 reads data. When the length of stored data belonging to the same group attribute is insufficient and, within an effective pointer range, a different group attribute has been stored as effective data, the bus width selection means 256 inserts dummy data, together with the same group attribute data, for filling up the lack of data for the necessary bus width.

Upon the receipt of a request from the buffer for reading, the buffer control means 22 reads data from the necessary buffer pointer position according to the control line corresponding to the output bus width notified from the bus width control means 256, upon the completion of reading from a certain buffer pointer position, the buffer storage attribute is reset to 0(zero) to release the buffer and, at the same time, to update the read pointer. In this case, since the bus width of the buffer means 23 is different from the output bus width, there are two cases, i.e. a case where one or a plurality of buffer pointers are accessed by one reading and a case where one buffer pointer is accessed by a plurality of times of reading. This is influenced by the update control of the read pointer and the reset control of the storage attribute.

At the time of reading, upon the receipt of the request from the buffer read request control means 253 for reading, the buffer means 23 reads data content from the buffer corresponding to the bus width in the section from the read pointer and, every time when the reading of data has been completed for each buffer, the buffer means 23 resets the storage attribute to a value of 0(zero). Upon the receipt of a request from the buffer read request control means 253 for reading of the corresponding group attribute data, when data is not stored in the buffer, a standby state is adopted.

At the time of inputting, the address administration means 24 incorporates address information from the input address notification means 214, shown in FIG. 8, within the input control means 21 through the address input means 241 shown in FIG. 12, in synchronization with group attribute information in the control signal from the buffer access control means 29 and stores, using pointer control by ADTWP, the address information into the address table on the address storage means 242. At the time of storage, the address storage means 242 sets the address table storage attribute to 1 or a value of more than 1 for indicating that the storage has been completed.

At the time of outputting, upon the receipt of a request in a control signal, from the output address control means 254 within the output control means 25, for address output, the address administration means 24 fetches the address from the address storage means 242 through the address selection means 244 and sends the fetched address to the output control means 25. In this case, the address storage means 242 performs pointer control by ADTRP shown in FIG. 13 and executes the fetch of the address from the address table. Further, at the time of reading, the address storage means 242 resets the address table storage attribute to 0(zero), for releasing the corresponding pointer position of the address table.

When control is carried out without the consideration of the group attribute, a simple FIFO structure may be adopted wherein the address storage means 242 deletes both the group attribute and the storage attribute from FIG. 13 and only ADT (m) is stored. In this preferred embodiment, an example of the construction of an address table has been used for realizing output addressing by the address control means 26.

The address control means 26 is provided when the address information is administered separately by a processor such as an external CPU or the like on the assumption that DMA or the like is used. Upon the receipt of addressing from an external part, addressing interface means 261 directly or indirectly accesses the address storage means 242. Thus, in this preferred embodiment, means is provided which externally controls the storage value of the output address and performs address conversion between the input address and the output address.

Thus, according to this preferred embodiment, the provision of the buffer control means 22 and the output bus width selection means 256 within the buffering apparatus 20 can realize integral processing. For example, in the prior art technique, when the reading access from the buffer is always fixed to 32 bits and the bus width is expanded to 64 bits in an external part, access should be carried out twice, on the other hand, in this preferred embodiment, 64-bit or 128-bit data can be fetched by single access.

Further, in this preferred embodiment, control lines according to a plurality of bus widths are integrated within the buffering apparatus 20. Therefore, even when address information is present for each group of a series of data and a plurality of data groups (a plurality of groups of a series of data) are present together in the buffer means 23, flexible control of output address can be realized by externally designating the output address in applications such as DMA transfer.

Furthermore, in this preferred embodiment, the buffer means 23 comprises buffers (such as FIFOs) with the maximum data length being fixed, and, even when a certain group of data does not reach the maximum data length of the buffer, a next group of data can be stored in the buffer in its idle portion, contributing to improved buffer utilization.

The invention is not limited to the above preferred embodiment, and modifications and variations are possible. For example, in the address control means 26, when both input address and output address are written in the address table, complete address conversion can be realized. When this is rendered asynchronous with the actual input address and is simply provided as address conversion means, in the case where input address retrieval means for input address from the input control means 21 and input address of the address storage means 242 is required and, thus, a relatively large number of address settings are necessary, for example, a method may be adopted wherein input address is retrieved with CAM or the like In the above preferred embodiment, the buffer means 23 comprises buffers having an FIFO structure. The structure, however, is not limited to FIFO, and, for example, a table-type (include conventional memory) structure may be adopted. In this connection, it should be noted that, when a memory, such as a random access memory (RAM), is used, a register or the like should be separately provided so that the buffer attribute can be always monitored by the output control means 25.

Further, regarding the output control means 25, when address and data are sent in a time divided form onto an identical bus, multiplexer means for address and data is separately mounted.

As described above, the invention has the following features.

At the outset, since the buffer control means and the output control means are included within the apparatus, integral processing is possible. Therefore, for example, in the prior art technique, when the reading access from the buffer is always fixed to 32 bits and the bus width is expanded to 64 bits in an external part, access should be carried out twice, whereas, in the invention, 64-bit or 128-bit data can be fetched by single access. This can optimize the processing.

Secondly, according to the invention, rather than signal line control for each bus width, a method is adopted wherein address control means holds address information in relationship with each group of a series of data written in buffer means to realize signal line control for each data group output from the buffer means. According to this construction, for example, even when address information is present for each group of data and a plurality of data groups are present together in the buffer means, flexible control of output address can be realized by administrating address in one-to-one relationship with each data group in the address table, or by externally designating the output address in applications such as DMA transfer.

Thirdly, according to the invention, rather than handling of only two data groups in two juxtaposed buffers, the realization of relatively flexible handling of buffer length relative to the data length permits a plurality of data groups to be stored in parallel in the buffer means at a time, Therefore, in the buffer means, when a construction is adopted wherein several buffers with the maximum data length being fixed are provided, even in the case where a certain data group does not reach the maximum data length, unlike the prior art technique wherein the buffer in its idle portion cannot be allocated to a different group of data, according to the invention, a next data group can be stored if there is an idle portion in the buffer, contributing to improved buffer utilization.

The invention has been described in detail with particular reference to preferred embodiments, but it will be understood that variations and modifications can be effected within the scope of the invention as set forth in the appended claims.

What is claimed is:

1. A buffering apparatus comprising:
   input control means that permits the input of a plurality of groups of a series of data, which have been combined in time sequence, detects a break of each group of a series of data, and separates address information from on an input bus;

buffer means comprising a plurality of buffers;

buffer control means for writing, based on the break information, each group of a series of data transferred from the input control means into each buffer in the buffer means and for reading the written group of data;

address administration means which holds the address information, sent from the input control means, in relationship with each group of a series of data written in the buffer means, and, at the time of output involving reading the group of a series of data from the buffer means, upon the receipt of a request for address, fetches the held address and sends the fetched address to the buffer control means; and output control means which, in response to a request from an external part for reading, makes a request to the address administration means for address notification and sends the address information received from the address administration means, to the external part and, in addition, controls the buffer control means so as to read the data group from the buffer means, divides or combines a bus width of the read data group and selectively sends the data to an output bus having a required bus width in a plurality of output buses having mutually different bus widths;

wherein, at the time of writing of the group of a series of data into the buffer means, the buffer control means updates group attribute value for each writing of the group of a series of data and notifies the buffer means and an address control means of the group attribute value and, in addition, updates a write pointer for each data and performs writing in the buffer means, and the buffer means writes, in the buffer at the storage position of the write pointer, the data, the group attribute value, and a predetermined storage attribute value representing the storage.

2. The buffering apparatus according to claim 1, wherein, at the time of reading of the group of a series of data from the buffer means, the buffer control means reads the data from the buffer within the buffer means at a predetermined buffer pointer position according to the output bus width and, upon the completion of reading, the buffer control means changes the storage attribute of the buffer to a predetermined value representing idle.

3. The buffering apparatus according to claim 2, which further comprises address control means for, upon the receipt of addressing from the external part, directly or indirectly accessing the address administration means.

4. The buffering apparatus according to claim 1, which further comprises address control means for, upon the receipt of addressing from the external part, directly or indirectly accessing the address administration means.

5. A buffering apparatus comprising:

input control means, provided within the buffering apparatus, said input control means having a data group detection means that permits the input of a plurality of groups of a series of data, which have been combined in time sequence, detects a break of each group of a series of data, and separates address information from on an input bus;

buffer means comprising a plurality of buffers;

buffer control means for writing, based on the break information, each group of a series of data transferred from the input control means into each buffer in the buffer means and for reading the written group of data;

address administration means provided within the buffering apparatus which holds the address information, sent from the input control means, in relationship with each group of a series of data written in the buffer means, and, at the time of output involving reading the group of a series of data from the buffer means, upon the receipt of a request for address, fetches the held address and sends the fetched address to the buffer control means;

output control means provided within the buffering apparatus which, in response to a request from an external part for reading, makes a request to the address administration means for address notification and sends the address information received from the address administration means, to the external part and, in addition, controls the buffer control means so as to read the data group from the buffer means, divides or combines a bus width of the read data group and selectively sends the data to an output bus having a required bus width in a plurality of output buses having mutually different bus widths; wherein the buffering means stores the groups of a series of data in a plurality of buffer data regions and additionally stores, in one-to-one relationship with the data regions, a group attribute, which is different from data group to data group and is identical in the same data group, and a storage attribute representing a stored state or a unstored state, and the output control means comprises at least: buffer read request control means which, in response to a request from the external part for reading, reads the data group from the buffer means through the buffer control means; output address control means which makes a request to the address administration means for address notification, receives address information from the address administration means, and sends the address information to the external part; buffer attribute monitoring means for monitoring, based on the group attribute and the storage attribute, whether or not data of the same group attribute having a data length corresponding to the bus width is stored in the buffer means; buffer attribute control means for controlling the attribute value at the time of reading of the data from the buffer means; and bus width selection means for selectively sending, to an output bus with a bus width to be output, the data of the same group attribute having a data length corresponding to the bus width read from the buffer means through the buffer control means.

6. The buffering apparatus according to claim 5, wherein, when the length of data of the same group attribute stored in the buffer means is shorter than the width of the output bus, the bus width selection means inserts a dummy data for supplementing the deficit data into the data read from the buffer means and outputs the data.

7. The buffering apparatus according to claim 6, which further comprises address control means for, upon the receipt of addressing from the external part, directly or indirectly accessing the address administration means.

8. The buffering apparatus according to claim 5, which further comprises address control means for, upon the receipt of addressing from the external part, directly or indirectly accessing the address administration means.

9. A buffering apparatus comprising:

input control means that permits the input of a plurality of groups of a series of data, which have been combined in time sequence, detects a break of each group of a series of data, and separates address information from on an input bus;

buffer means comprising a plurality of buffers;

buffer control means for writing, based on the break information, each group of a series of data transferred from the input control means into each buffer in the buffer means and for reading the written group of data;

address administration means which holds the address information, sent from the input control means, in relationship with each group of a series of data written in the buffer means, and, at the time of output involving reading the group of a series of data from the buffer means, upon the receipt of a request for address, fetches the held address and sends the fetched address to the buffer control means; and output control means which, in response to a request from an external part for reading, makes a request to the address administration means for address notification and sends the address information received from the address administration means, to the external part and, in addition, controls the buffer control means so as to read the data group from the buffer means, divides or combines a bus width of the read data group and selectively sends the data to an output bus having a required bus width in a plurality of output buses having mutually different bus widths;

wherein the address administration means comprises: address input means for incorporating address information from the input control means; address storage means for storing, in a table form, the address, incorporated by the address input means, together with a group attribute of the data group and a storage attribute for representing a stored or unstored state, in one-to-one relationship with the data group written in the buffer means; address selection means which, upon the receipt of a request from the output control means for address output, fetches the address stored in the address storage means; and address notification means for sending the address selected by the address selection means to the output control means.

10. The buffering apparatus according to claim 9, wherein the address storage means executes reading of the address from the address table by a read pointer and resets the storage attribute corresponding to the read address.

11. The buffering apparatus according to claim 10, which further comprises address control means for, upon the receipt of addressing from the external part, directly or indirectly accessing the address administration means.

12. The buffering apparatus according to claim 9, which further comprises address control means for, upon the receipt of addressing from the external part, directly or indirectly accessing the address administration means.

* * * * *